No. 734,860. PATENTED JULY 28, 1903.
S. HARPER.
CLOTHES POUNDER.
APPLICATION FILED OCT. 20, 1902.
NO MODEL.

WITNESSES:
John E Walsh
Allan Bennett.

INVENTOR:
Stephen Harper.

THE NORRIS PETERS CO., PHOTO-LITHO., WASHINGTON, D. C.

No. 734,860. Patented July 28, 1903.

UNITED STATES PATENT OFFICE.

STEPHEN HARPER, OF LEEDS, ENGLAND.

CLOTHES-POUNDER.

SPECIFICATION forming part of Letters Patent No. 734,860, dated July 28, 1903.

Application filed October 20, 1902. Serial No. 128,006. (No model.)

*To all whom it may concern:*

Be it known that I, STEPHEN HARPER, a subject of the King of Great Britain and Ireland, residing at Leeds, in the county of York, England, have invented a new and useful Improvement in Clothes-Pounders, of which the following is a specification.

It consists in the novel construction and combination of the parts hereinafter fully described and claimed.

Figure 1:
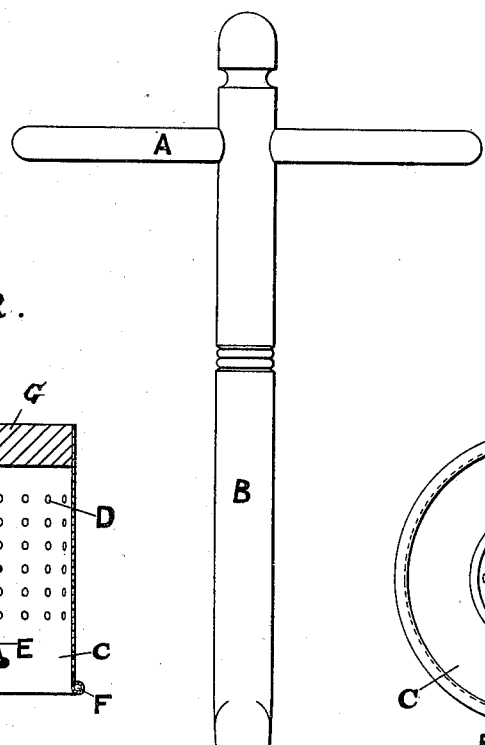
Figure 2:
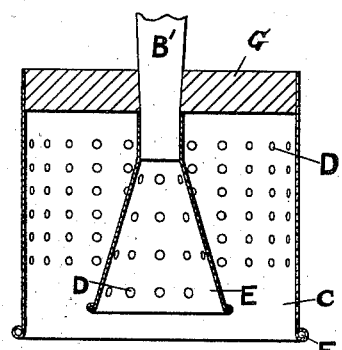
Figure 3:
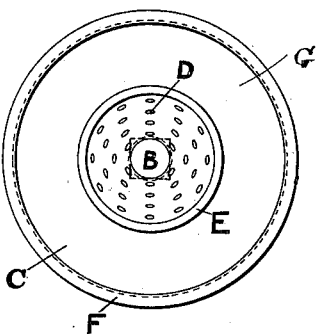
Figure 3:
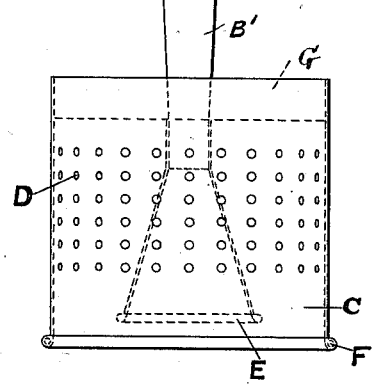

In the drawings, Figure 1 is a side view of the clothes-pounder. Fig. 2 is a vertical section through the lower part of the pounder. Fig. 3 is a plan view of the pounder from below.

B is an operating-handle provided with a cross-piece A at its upper part. The lower part B' of the handle is tapered, and it is secured centrally in a disk G. C is a cylinder secured around the periphery of the disk G and provided with perforations D. The cylinder C also has a bead F at its bottom edge.

E is a hollow cone secured on the projecting end B' of the handle below the disk and inside the cylinder C. The cone E is also provided with perforations D.

The cone E is secured on the handle independent of the disk G, and when the disk G moves on the handle it does not loosen the cone E. As the disk G becomes loose on the tapering portion of the handle from use in pounding clothes it is pushed farther up the tapering handle, and in this manner the device is kept in good working order.

What I claim is—

In a clothes-pounder, the combination, with a handle having a tapering portion near its lower end, of a disk secured on the said tapering portion, a perforated cylinder secured around the periphery of the said disk, and a perforated hollow cone having its smaller end secured to the lower end portion of the said handle which projects through the said disk inside the said cylinder, said cone being secured independent of the said disk and cylinder and being arranged inside the said cylinder with its bottom edge above the level of the bottom edge of the cylinder.

In testimony whereof I have signed my name to this specification in the presence of two subscribing witnesses.

STEPHEN HARPER.

Witnesses:
JOHN E. WALSH,
ALLAN BENNETT.